United States Patent [19]

Berglin et al.

[11] Patent Number: 4,552,748
[45] Date of Patent: Nov. 12, 1985

[54] METHOD IN THE PRODUCTION OF HYDROGEN PEROXIDE

[75] Inventors: Carl T. Berglin, Alafors; Wolfgang Herrmann, Gothenburg, both of Sweden

[73] Assignee: EKA AB, Surte, Sweden

[21] Appl. No.: 529,730

[22] Filed: Sep. 6, 1983

[30] Foreign Application Priority Data

Sep. 8, 1982 [SE] Sweden ............... 8205093

[51] Int. Cl.⁴ .......................................... C01B 15/023
[52] U.S. Cl. ................................................... 423/588
[58] Field of Search ........................................ 423/588

[56] References Cited

U.S. PATENT DOCUMENTS

| | | | |
|---|---|---|---|
| 2,983,584 | 9/1961 | Sancelme | 423/588 |
| 3,009,782 | 11/1961 | Porter | 423/588 |
| 3,030,186 | 4/1962 | Krenz et al. | 23/207 |
| 3,062,622 | 11/1962 | Darbee et al. | 23/207 |
| 3,755,552 | 8/1973 | Lee et al. | 423/588 |
| 4,258,025 | 3/1981 | Copelin | 423/588 |
| 4,336,241 | 6/1982 | Diamond et al. | 423/588 |

FOREIGN PATENT DOCUMENTS 00418114 12/1981 European Pat. Off.

Primary Examiner—Andrew H. Metz
Assistant Examiner—Terryence Chapman
Attorney, Agent, or Firm—Luedeka & Neely

[57] ABSTRACT

A method in the production of hydrogen peroxide is described, utilizing the so-called anthraquinone process in which alkylated anthraquinones dissolved in organic solvents to form a liquid working solution, are alternately reduced and oxidized. The working solution is subjected to catalytic hydrogenation by contacting it with hydrogen in the presence of a hydrogenation catalyst. The contact with hydrogen is established in a fixed catalyst bed comprising one or more solid catalyst bodies, each of which consists of a thin-walled, coherent, solid body of a structure forming parallel channels through which the working solution and hydrogen gas are allowed to pass. The channels of the catalyst bed are of equal length and parallel to the direction of flow of the working solution. The catalyst preferably is provided in a thin layer on the walls of the structure, preferably by means of a porous carrier.

10 Claims, 2 Drawing Figures

METHOD IN THE PRODUCTION OF HYDROGEN PEROXIDE

The present invention relates to a method in the production of hydrogen peroxide by alternate reduction and oxidation of alkylated anthraquinones.

Hydrogen peroxide is produced, in general, by the so-called anthraquinone process by alternate reduction and oxidation of alkylated anthraquinones dissolved in suitable organic solvents. The solution of anthraquinones, the so-called working solution, is first treated with hydrogen gas in the presence of a catalyst in the so-called hydrogenation stage, whereupon the working solution is passed to the so-called oxidation stage in which it is contacted with air or oxygen-containing gas to form hydrogen peroxide. The reaction schedule of these hydrogenation and oxidation stages, respectively, may be exemplified as follows

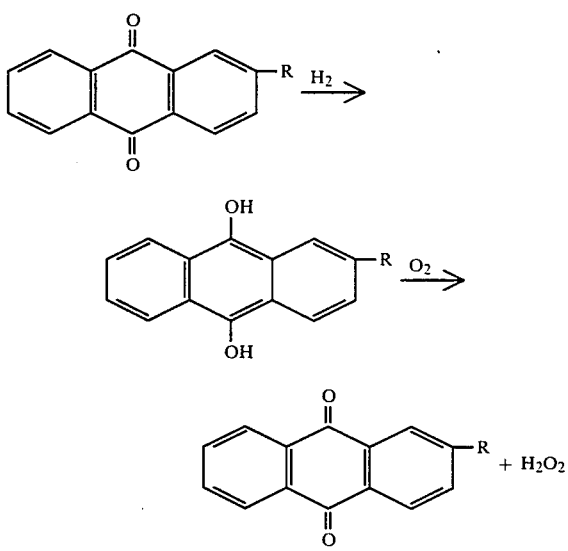

R=alkyl, for instance $C_2H_5$.

The hydrogen peroxide-containing working solution is then usually passed on to a so-called extraction stage in which the hydrogen peroxide is removed from the working solution by extraction with water, whereupon the working solution is recycled to the hydrogenation stage for another cyclic run through the reaction stages described above.

The above-mentioned hydrogenation is an important step of this continuous process and is fraught with considerable difficulties. On hydrogenation, great demands are placed on a high and uniform productivity, and on the selectivity of the reaction to avoid side reactions preventing the hydrogen peroxide formation or making it more difficult. The selectivity depends upon a number of factors such as the reaction degree of the anthraquinones, the hydrogenation temperature, the hydrogen gas pressure, the catalyst and the flow conditions at the catalyst.

To achieve satisfactory productivity and selectivity in the hydrogenation reactor, one aims at establishing good contact between the catalyst and the reactants hydrogen gas and working solution during a well-defined period of time and at a suitably selected temperature in the reactor. In most cases, this is achieved by intensely mixing hydrogen gas, working solution and catalyst in the reactor.

To achieve this intense mixing, use is made, for example in the methods disclosed by German Patent Specification No. 812,426, British Patent Specification No. 718,307 and German Patent Specification No. 1,542,089, of a finely-divided catalyst which is held in suspension. The difficulty in using so-called suspension catalysts is that the working solution, before it is passed on to the oxidation stage, must not contain any noble metal catalyst which is the type of catalyst usually employed in these hydrogenation methods, because it would result in the decomposition of hydrogen peroxide in the oxidation stage. The working solution must therefore be filtered through a filter device in or outside the hydrogenation reactor before it is passed on to the oxidation stage. The filter device, the so-called primary filter, may be complemented with additional filter devices to ensure that the entire catalyst is separated.

The use of such filter devices for separating the catalyst from the working solution creates a number of difficulties. The catalyst which must be held in suspension to maintain the hydrogenation capacity covers the surface of the primary filter, and this results after some time in a reduced catalyst concentration in the hydrogenation reactor, and this in turn causes a reduction in productivity. Furthermore, the catalyst particles are crushed by the agitator proper to smaller particles, which means that the filters will be clogged more quickly as time passes, and this again causes a reduced flow of working solution through the hydrogenation reactor.

The catalyst concentration in the hydrogenation reactor can be restored to a tolerable extent, and also the filtration capacity can be partially restored by periodically effecting so-called backwashing of the primary filters. By this technique, a part of the solution which is free from catalyst and which has already left the reactor, is periodically recycled through the filters, usually by means of pressure-increasing pump means. However, between these backwashings, the filters are again clogged, which means that part of the amount of catalyst cannot be utilised efficiently. To compensate for this, an additional amount of catalyst must be supplied, whereby the cost of the process is increased considerably.

To avoid the difficulties encountered in suspension catalysts, various suggestions have been made. Thus, German Patent Specification No. 1,064,343 describes an improved backwashing method, German Patent Specification No. 1,272,292 describes the use of charcoal filters to improve the separation of finely-divided noble metal catalysts, while British Patent Specification No. 718,307 describes a special hydrogenation reactor without agitating means to reduce the crushing of catalyst particles.

All of these known methods of carrying the hydrogenation stage of the anthraquinone process into effect in the presence of suspension catalysts suffer from the disadvantage that they require expensive primary filter devices for separating the catalyst from the working solution, which filter devices, in spite of various backwashing procedures, are clogged after some time. The primary filters must then be exchanged or subjected to extensive cleaning operations to restore the filtration capacity to its original level.

Another possibility of avoiding the difficulties encountered in connection with suspension catalysts is to use instead a so-called fixed bed catalyst which consists of a bed of relatively coarse catalyst particles, usually having a diameter of about 1-10 mm. In such a catalyst, the working solution and finely-divided hydrogen gas are passed through the particle bed which is held in position by some type of supporting means, such as a netting.

To be able efficiently to utilise the expensive catalyst and working solution, it is endeavoured to optimise the fixed bed catalyst, such that there is obtained a high selectivity at high production rates and a small bed volume per weight unit of catalyst metal.

Considerable difficulties are encountered in the use of fixed bed catalysts because of the structure which is formed when the individual particles which may be spherical or have irregular shape, are packed to form a bed through which hydrogen gas and working solution are to pass. For an efficient utilisation of the catalyst, adequate contact between the surface of the catalyst material and the reactants hydrogen and the anthraquinones dissolved in the working solution is required. Since it is the hydrogen dissolved in the working solution which reacts on the active catalyst seats, an efficient transfer of the gaseous hydrogen from the bubbles to the hydrogen dissolved in the working solution is of great importance to the utilisation of the catalyst, especially since the catalyst is extremely active.

To facilitate the dissolution of hydrogen gas in the working solution, Canadian Patent Specification No. 869,919 proposes introducing into the catalyst bed additional inert packing layers arranged in accordance with the sandwich principle, which results in a far greater reactor volume and, contingent thereon, an increased volume of expensive working solution.

To increase the productivity in the solid bed catalyst it is, of course, also possible to increase the flow of hydrogen gas through the catalyst bed, but this may cause wear on the catalyst particles and thus a loss of catalyst, as is pointed out in U.S. Patent Specification No. 2,837,411 which therefore proposes using an extra tank for saturating the working solution with hydrogen gas at high pressure, whereupon the working solution saturated with dissolved hydrogen is passed on to the hydrogenation reactor proper containing the fixed bed. Also this technique is disadvantageous in that it requires additional equipment and pressure for the saturation operation as well as an additional volume of working solution to fill the equipment.

Another disadvantage encountered in using particle fixed beds is mentioned in Swedish Patent Specification No. 382,200, i.e. the tendency to form separate flow channels for the working solution and the hydrogen gas through the bed, which means that gas and liquid are separated so that the catalyst cannot be used efficiently. This phenomenon is usually termed "channeling".

Furthermore, a particle fixed bed involves the risk of nonuniform packing density and, thus, different channel structures in different parts of the bed, as a result of which the flow of hydrogen gas and working solution will be different in different parts of the bed, and this again may, because of uncontrolled and frequently too long contact times, cause the permissible temperature and reaction degree of the anthraquinones to be exceeded locally, resulting in an increased formation of undesired by-products and precipitates.

Furthermore, a general disadvantage of particle fixed beds, as compared with the more fine-grained suspension catalysts, is that expensive catalyst metal coating the inner parts of the large fixed bed particles is not readily accessible for reaction purposes, and this means that the catalyst is not efficiently utilised and the selectivity frequently becomes inadequate.

In carrying out the hydrogen peroxide method in accordance with the anthraquinone process in practical and continuous operations, great demands are placed upon constant reaction conditions throughout the method cycle in respect of working solution flows, reaction rates and temperatures in the different method stages, especially in the hydrogenation stage where, for example, the catalyst activity is reduced more or less rapidly. If a so-called suspension catalyst is used in the hydrogenation stage, it is comparatively easy to maintain a constant reaction degree by simply conducting away a quantity of consumed catalyst and, equally simply, to supply fresh catalyst suspension to the reactor chamber. Although, when use is made of a hydrogenation stage with the prior art pellet fixed bed devices, the expensive filter devices required for suspension hydrogenation can partly be dispensed with, there is instead the disadvantage that the productivity of the catalyst cannot be maintained at a constant level for longer periods of time. In view hereof, the prior art pellet fixed beds used in the hydrogenation stage must be replaced relatively frequently by fresh catalyst pellets, and this usually means that production must be interrupted for emptying the reactor container.

It is known that in the purification of exhaust gases, for example automobile exhaust gases, use can be made of small volumes of so-called monolithic catalysts to avoid the large pressure drops and clogging problems in the exhaust emission systems which are encountered with other types of fixed bed catalysts, for example pellets.

It is the object of this invention to provide a hydrogenation stage in the production of hydrogen peroxide by the so-called anthraquinone process, a process stage with gas-liquid-solid phase reaction, use being made of a catalyst which does not require any primary filtration, but has all of the advantages of the suspension catalyst, including controlled temperature and reaction conditions in the reactor, and an efficient catalyst utilisation with a high degree of selectivity. It has surprisingly been found that the catalyst utilised in the context of this invention also has a very long life.

The present invention thus comprises a method in the production of hydrogen peroxide by alternate reduction and oxidation of alkylated anthraquinones which are dissolved in one or more organic solvents to form a liquid-working solution which is subjected to catalytic hydrogenation in that it is contacted with hydrogen in the presence of a hydrogenation catalyst. In this method, hydrogenation is achieved by causing the working solution and hydrogen to flow through a catalyst bed consisting of one or more ordered catalyst bodies built up of a thin-walled and coherent structure with parallel through channels where the catalyst bodies together form a catalyst bed also having parallel and equally long channels.

The catalyst body preferably is built up of alternately planar and corrugated layers forming bundles of parallel channels, but other embodiments may also be used.

Furthermore, the catalyst body may be built up of a solid, preferably inert structure to the walls of which the hydrogenation catalyst is fixed in the form of a thin layer. The catalyst may be applied to the structure by means of a porous carrier.

Alternatively, the walls of the catalyst body may be completely built up of a porous carrier, the pores or lattice of which contains the hydrogenation catalyst. To ensure stability, the walls preferably should be reinforced with an inert thin woven fibrous material, such as glass cloth.

The catalyst body thus comprises a coherent structure which consists of a multiplicity of parallel through channels, the open diameter of said channels being for example 0.5–10 mm, preferably 1–2 mm. The wall thickness of the structure may lie between about 0.03 and 1 mm, preferably between 0.1 and 0.3 mm.

In the method according to the invention, the working solution and the hydrogen dissolved therein are caused to flow through the parallel channels, to the walls of which the catalytically active material has been applied, anthrahydroquinone being formed by the reaction between the hydrogen and the anthraquinones dissolved in the working solution.

An important advantage of the present invention is that, because all of the channels in the catalyst bed are of equal length and substantially geometrically uniform, whereby a uniformly distributed pressure drop across the channels is ensured, the contact time can be maintained constant for all partial streams in the catalyst bed. In this manner, the reaction of anthraquinones in each cross-section of the catalyst bed is maintained constant, and this in turn has a considerable positive influence upon the selectivity in the anthraquinone process.

The catalytically active material may be any of the materials usually employed in the anthraquinone process, for example noble metals, alone or in mixture. Conventional catalysts are palladium, platinum, rhodium, or mixtures thereof.

The walls in the catalyst structure may consist of a non-porous or slightly porous catalytically inert material which can be directly coated with the catalytically active noble metal according to known technique. Suitable inert structure materials are glass cloth, aluminum, or a ceramic material.

To be able to utilise the structure still more efficiently, it is preferably first coated with a layer of a porous catalyst carrier to which the hydrogenation catalyst is then applied. Suitable catalyst carriers are, for example, silicate, silica, alumina and active carbon which can be applied to the structure in a layer of the desired thickness, preferably a relatively thin layer.

It is known that the catalytically active metal preferably should be located in the outer layer of the catalyst structure where it can be utilised more efficiently. Thus, British Patent Specification No. 1,267,794 discloses a spherical shell catalyst for use in connection with fixed bed hydrogenation of anthraquinones.

By coating a coherent and thin structure used in the context of this invention with a layer of a catalyst carrier, there is obtained a so-called shell catalyst with all its advantages which imply not only that the expensive noble metal is utilised more efficiently, but also that an improved selectivity is achieved. Thus, the reaction degree of the anthraquinones in the catalyst pore system a short distance from the catalyst surface can be maintained at a level such that the risk of undesired by-products being formed can be reduced.

The catalyst bed preferably is built up of one or more cylindrical segments which may have a height of from 0.1 to about 1 m. A suitable segment height is 0.2 m. The diameter of the segment may be practically the same as the inner diameter of the hydrogenation reactor. Several segments can be connected in series in the reactor until there is obtained a bed volume having sufficient production capacity.

In the hydrogenation reaction, the working solution and the hydrogen gas are conducted either countercurrently or cocurrently through the catalyst bed, preferably cocurrently. A part of the working solution is then recycled and mixed with fresh nonhydrogenated working solution and fresh hydrogen gas before it is again passed through the catalyst bed. Recycling of the working solution preferably is effected by means of a pump, but can also be done by means of a strong flow of hydrogen gas bubbles introduced at the bottom of the bed, whereby the working solution is transported in the direction of the rising bubbles (the mammoth pump principle). In the latter case, the catalyst bed need not completely fill out the diameter of the hydrogenation reactor, whereby the working solution can be recycled in a downward direction through the free gap between the inner cylindrical wall of the reactor and the fixed bed cylinder. However, the method in which the working solution is recycled is of no critical importance to the concept of the invention.

The hydrogenation reactor preferably consists of a vertical cylindrical tank having a removable top wall. The catalyst bed previously prepared is placed within the tank, either in a single volume or divided into several sections, and is fixed with special fixing means providing a mechanical protection for the catalyst bed upon insertion into and removal from the reactor and facilitating connection to suitable hoisting means.

Since no primary filtration is required, several hydrogenation reactors may be connected in series in order optimally to utilise the dependence of the productivity and the selectivity on such factors as, for example, the hydrogen pressure, temperature and reaction degree.

In carrying the method according to the invention into effect, the tank is closed and then filled with working solution, whereupon the working solution and hydrogen gas can be circulated through the catalyst bed. In the method according to the invention, the reaction heat can be optionally cooled off either in the recycling flow or in the inflow to the reactor. During operation, working solution and hydrogen gas are continuously supplied to the recycling flow of the reactor which, when passing through the catalyst bed, forms anthrahydroquinones.

After the passage through the catalyst bed, a partial flow containing hydrogenated working solution is continuously withdrawn from the reactor and passed on to further hydrogenation stages or to the oxidation stage of the anthraquinone process where anthrahydroquinone is oxidised to anthraquinone while forming hydrogen peroxide. The hydrogen peroxide formed is then washed out of the working solution with water in a subsequent extraction stage. In principle, the working solution may then be recycled to the hydrogenation stage for a further passage through the process cycle described above.

The relationship between the working solution flow recycled to the catalyst bed and the net flow to the hydrogenation reactor may be so selected that the hydrogenation depth and the temperature are maintained at desired levels along the catalyst fixed bed with due regard to the formation of by-products.

By-products are anthraquinone compounds which only with great difficulty or not at all are capable of forming hydrogen peroxide in the subsequent oxidation stage. The formation of by-products can be minimised either by using a selected catalyst or by choosing suitable reaction conditions in respect of temperature and reaction degree of anthraquinone (the reaction degree is also termed hydrogenation depth). Generally, low hydrogenation temperatures give a low formation of by-products, but a low hydrogenation rate and, thus, a low production capacity in the reactor. A high temperature, on the other hand, gives a high reactive capacity, it is true, but also a greater amount of by-products upon each passage through the reactor. It therefore is important to carefully check the temperature and the reaction degree during the reaction.

The hydrogenation stage is carried out at 40°–70° C., generally at about 50°–55° C., and at a reaction rate of up to 80% of the amount of anthraquinone supplied. In this manner a suitable compromise is obtained between the demand for high production capacity per unit of volume of the reactor and the amount of by-products formed.

Depending upon the relationship between the reactor inflow and the flow recycled to the catalyst bed, the temperature will rise to a greater or less extent when the working solution and the hydrogen gas pass through the catalyst bed. At the relatively low recirculation rates used in prior art particle fixed bed reactors, it is necessary, because of the flow resistance and the risk of wear on the catalytically active material, to cool the working solution before it is recycled to the fixed bed so that the maximum permissible temperature is not exceeded during passage through the bed. As a result, the reaction yield will be lower and the catalyst in part of the catalyst bed will not be fully utilised.

One of the advantages offered by the catalyst structure employed in the context of this invention is that it can operate at high flow loads per unit of surface of the cross-sectional area of the catalyst bed, without causing large pressure drops that must be overcome by high pump effects. With these high flow loads there is obtained, together with dispersed hydrogen gas, a high mixing effect in the channels and thus adequate contact between the reactants and the catalyst, which has a favorable effect both on the productivity and the selectivity.

A further advantage of the fixed bed catalyst according to the present invention is that the low pressure drops permit such high flow rates within the system that, if the flow is conducted cocurrently, hydrogen gas is readily recycled to the bed, and the catalyst system can operate at hydrogen gas loads which, on an average, are higher than in other fixed bed methods, which in some cases has an effect on productivity and further improves the flow distribution in the catalyst bed.

The main advantage achieved by using the catalyst bed structure herein defined resides, however, in the well-defined and well-controlled reaction conditions which are obtained by dividing the inflow of working solution and hydrogen gas to the catalyst bed into a multiplicity of approximately equally large partial flows, the contact times of which with the catalyst will be of the same order during passage through the bed.

The method according to the present invention can be carried out under the pressure conditions usually employed in the hydrogenation stage of the anthraquinone process, i.e. at an excess pressure of about 10–1000 kPa, preferably 200–390 kPa.

Figure 1:
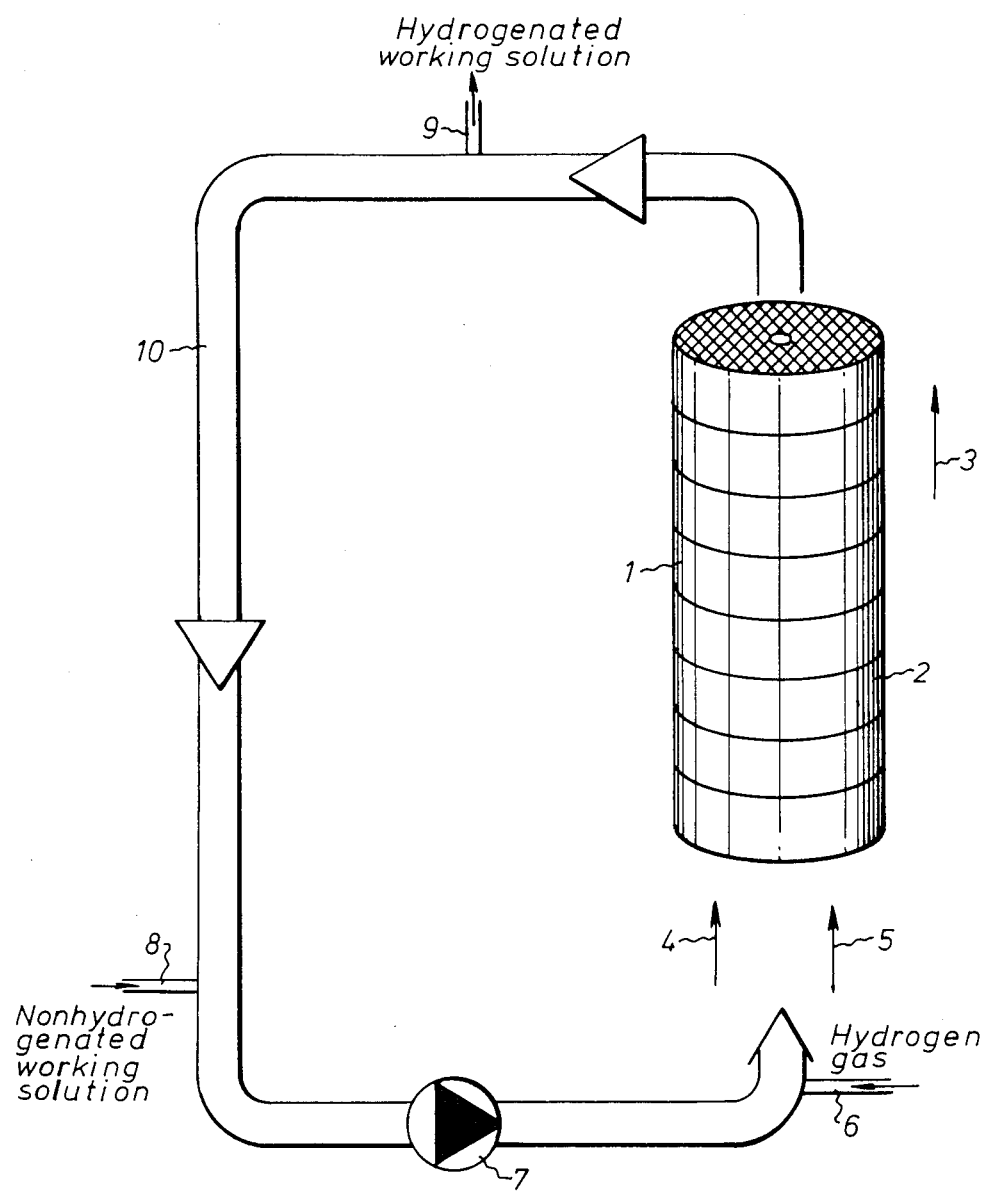
FIG. 1 illustrates a flow diagram for an embodiment of the method according to the present invention.
Figure 2:
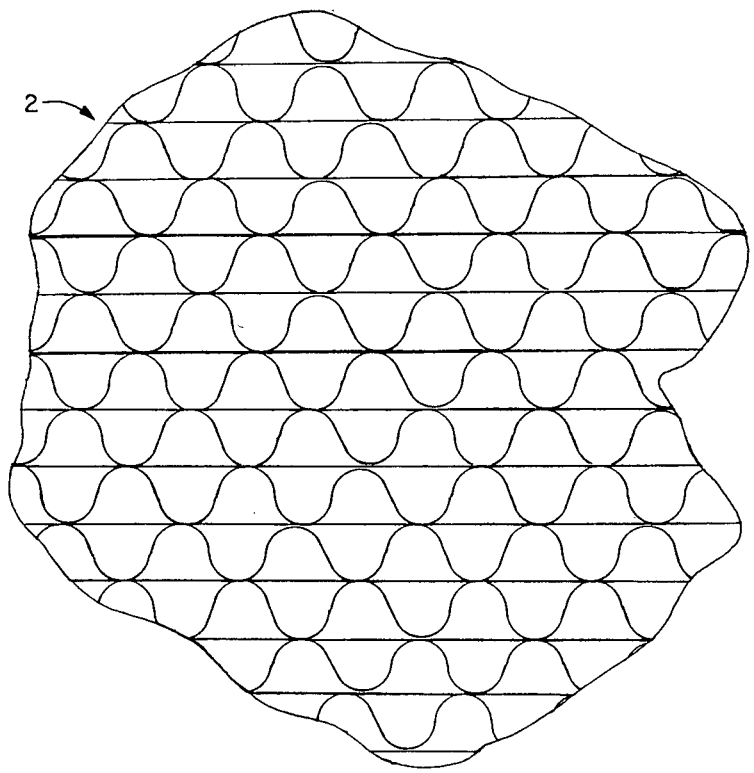
FIG. 2 is a partially broken away detailed top view of a preferred form of a catalyst body of the present invention having alternately planar and corrugated layers forming bundles of parallel channels.

In the drawings, a catalyst bed 1 is provided in a plant for continuous hydrogenation of working solution. The catalyst bed 1 comprises a number of catalyst bodies (segments) 2 which are arranged in series and such that parallel flow channels are formed along the entire bed 1 in the direction of the arrow 3. The working solution flows through the catalyst bed 1 in the direction of the arrow 4, and hydrogen gas bubbles in the direction of the arrow 5. Hydrogen gas is introduced at 6 into the system, and working solution and hydrogen gas are circulated through the system by means of a circulation pump 7. Nonhydrogenated working solution is introduced at 8, and hydrogenated working solution is withdrawn at 9. Some hydrogenated working solution is recycled at 10.

To further illustrate the present invention, the following Examples are given which merely are examples of forms of the invention and are not intended to restrict the scope of the invention as defined by the appended claims.

EXAMPLE 1

Test A—Comparison Test

In a pilot plant which comprised all of the partial stages for cyclically carrying the anthraquinone process into effect, the hydrogenation stage was carried out in a simple vertical tubular reactor loop having a diameter of 100 mm, into which hydrogen gas was introduced at one leg through a so-called Poral filter in such a manner that very small bubbles were obtained which, together with the working solution, were circulated in the loop by means of a pump. By the circulatory movement, the working solution and the hydrogen gas were conducted downwardly in one leg and upwardly in the other leg or, if necessary, vice versa in that the direction of rotation of the pump was reversed.

The volume in the reactor loop was maintained constant at about 30 liters. The inflow to the reactor which was the same as the outflow of the working solution, was about 20 liters/hour. During the hydrogenation reaction, an excess pressure of 200 kPa and a temperature of 55° C. were maintained.

The working solution which was circulated in the pilot plant, consisted of 83 g/l of THEAK (tetrahydroethyl anthraquinone) and 55 g/l of EAK (ethyl anthraquinone) dissolved in a solvent mixture containing 30% by volume of trioctyl phosphate and 70% of "Shellsol AB".

To the hydrogenation apparatus described above 50 g of catalyst in the form of finely-divided Pd, so-called palladium black, was batched and held in suspension by circulation pumping together with hydrogen gas and working solution.

In the reactor, anthraquinone reacted to anthrahydroquinone, and the hydrogenated working solution was conducted through a filter candle provided in one leg, before it was passed on to the oxidation stage. The filter device which consisted of porous carbon, was backwashed regularly to prevent clogging of the filters.

During the test which was conducted for about 1000 hours, the reaction of anthraquinones to anthrahydroquinones was maintained at 45%.

To maintain the reaction constant at the desired level, further fresh active palladium catalyst was periodically added during the test. The amount of palladium black added during 1000 hours was 22 g, while the amount of consumed catalyst withdrawn during the same period of time was determined at 20 g. In this manner, the amount of catalyst in the reactor was maintained constant.

The productivity, calculated in g of $H_2O_2$ produced per g of Pd per hour, was determined at 16 g.

The selectivity which may be expressed as the loss of active anthraquinone per amount of $H_2O_2$ produced, was determined at 0.18 mol per 1000 mols of $H_2O_2$ produced.

Test B

In the pilot plant according to test A, the hydrogenation stage was so modified that the filter device used in test A was removed and replaced by a tubular segment containing a fixed bed catalyst according to the invention. The fixed bed catalyst had a diameter of 80 mm and a volume of 1 liter, and its structure consisted of thin-walled glass fibre matrix material arranged as alternately planar and corrugated layers forming parallel bundles of through channels in the direction of flow within the reactor. The free channel diameter varied between 1.5 and 2 mm. Applied to the structure walls was a thin layer of porous silica gel, a large surface area of which was coated with Pd.

The test started with the same composition of the working solution and the same flow of working solution to and from the reactor as at the start of test A.

The reaction of anthraquinone to anthrahydroquinone was determined at 60% at the start of the test. The circulation flow in the reactor loop through the catalyst fixed bed according to the invention was held at a level as high as 300 liters/min to test the stability of the catalyst. During the major part of the test, the flow of working solution and hydrogen gas was from the bottom upwards.

At the beginning of the test, the productivity was determined at 80 g of $H_2O_2$ per g of Pd per hour, or 533 g of $H_2O_2$ per kg of catalyst per hour. A reversal of the flow direction through the bed (from the top downwards) did not affect the productivity.

After 1250 hours of operation, the productivity could be determined at 97% of the value at the beginning of the test.

The loss of active quinone during the test period was determined at 0.10 mol per 1000 mols of $H_2O_2$ produced.

The hydrogenated working solution which left the hydrogenation reactor was first conducted through a very fine-pored filter before entering the oxidation stage. After 1250 hours of operation, it was found that the filter contained about 0.2% of the catalyst material supplied to the reactor at the beginning of the test, in spite of the fact that the flow load on the catalyst bed was much higher than was necessary in order to maintain the productivity.

Test C—Comparison Test

In the hydrogenation apparatus previously described, the tubular segment containing the fixed bed catalyst was removed after test B and replaced by a tubular segment having an inner diameter of 80 mm and provided at its bottom with a netting. The tubular segment was filled with spherical catalyst pellets having a diameter of about 2 mm and consisting of a porous alumina carrier with 0.3% by weight of Pd to a level of 100 mm. During the hydrogenation test, working solution and hydrogen gas were circulated from the top downwards through the bed. The circulation flow in the reactor loop was reduced as compared with test B to 30 liters/min. because of the higher flow resistance of the particle fixed bed. The initial composition of the working solution was the same as in test A. Temperature and pressure were held at the same level as in tests A and B, and so was the supply of working solution.

At the beginning of the test, the productivity was measured at 314 g of $H_2O_2$ per kg of catalyst per hour, or 105 g of $H_2O_2$ per g of Pd per hour.

After about 600 hours of hydrogenation, the productivity had decreased to 90% of the initial activity, and after 1000 hours to 85%.

The selectivity expressed as loss of active quinone per 1000 mols of $H_2O_2$ produced was determined at 0.25 mol after 1000 hours.

As in test B, the hydrogenated working solution was filtered through a fine-pore filter before entering the oxidation stage. The amount of catalyst mass on the filter, which had detached itself from the bed, was determined after 1000 hours of continuous hydrogenation at about 0.5% of the amount of catalyst initially supplied.

EXAMPLE 2

Two catalyst bodies according to the invention were placed in a pilot reactor having a constant operating volume of about 270 liters and constructed basically like the hydrogenation apparatus of Example 1. Each circular segment had a diameter of 342 mm and a height of 200 mm, and the segments were placed in series. The catalyst bodies covered the entire tubular cross-section of one leg in the tubular reactor loop. Underneath the catalyst bed, the hydrogen gas was introduced through a Poral filter into the passing flow of working solution whose circulation rate in the reactor loop during the test was measured at about 80 m$^3$/hour. The very large recycling flow which was tenfold greater than was necessary on productivity grounds, was selected to provide maximum wear load on the catalyst during the test.

The inflow of working solution was maintained at about 300 liters/hour during the test. The working solution used during the test had approximately the same composition as at the beginning of test A in Example 1. During the test, the hydrogenation temperature was maintained at about 54° C. and the pressure at an excess pressure of about 230 kPa.

The reaction of anthraquinone to anthrahydroquinone was determined by analysis at about 50% at the beginning of the test, at a productivity of 67.0 g of $H_2O_2$ per g of Pd per hour, or 390 g per kg of catalyst bed per hour.

After more than 5000 hours of operation with these catalyst beds, the productivity was determined at 98% of the inital value, which shows the surprisingly high stability of the catalyst as compared with prior art hydrogenation catalysts used in the production of hydrogen peroxide.

The hydrogenated working solution which left the reactor device, was passed through a fine-pore filter for trapping any catalyst mass that might have detached itself from the bed during the tests.

The amount of catalyst mass that had detached itself during 5000 hours of operation was determined at but 0.12% by weight of the originally supplied catalyst, in spite of the fact that the flow load on the catalyst bed was very high.

EXAMPLE 3

Test A—Comparison Test

The hydrogenation reactor of the pilot plant for the production of hydrogen peroxide which was used during the tests in Example 1 was modified in such a way that the tubular segment with the fixed bed catalyst was dismounted from the tubular reactor loop and a primary filter device containing a Grade 5 Poral filter was mounted.

In the pilot plant thus modified, a working solution consisting of 74 g of amyl anthraquinone, 42 g of tetraamyl anthraquinone, 14 g of ethyl anthraquinone and 24 g of tetraethyl anthraquinone dissolved in a mixture of the solvents "Shellsol":nonanol:octanol in a volume ratio of 50:30:20, was circulated.

The hydrogenation reaction was carried out at 56° C. and at an excess pressure of 200 kPa. The catalyst was a known slurry catalyst which is used in processes for the production of hydrogen peroxide. The catalyst consisted of spherical, porous silicate particles having a diameter of 80 μm and containing 2% by weight of Pd. At the beginning of the test, about 90 g of catalyst were batched into the reactor. Productivity was determined at 68 g of $H_2O_2$ per g of Pd per hour at a 31% reaction of anthraquinone to anthrahydroquinone.

After about 192 hours of operation, productivity decreased to 56 g of $H_2O_2$ per g of Pd per hour.

Further catalyst was batched so that the amount of catalyst in the reactor was 140 g in all. The productivity then rose temporarily to 74 g $H_2O_2$ per g of Pd per hour at a 53% reaction of anthraquinone to anthrahydroquinone.

After further operation for 480 hours, productivity had descreased to 29 g of $H_2O_2$ per g of Pd per hour.

After a test period of 672 hours, the working solution was analysed and the loss of so-called active quinones was determined at 2.4 mols of quinone per 1000 mols of $H_2O_2$ produced.

The primary filter was replaced once during the test period. The filter had been clogged by crushed catalyst particles, in spite of periodic backwashings.

Test B

After test A was finished, the hydrogenation reactor was again modified in that a tubular segment containing a fixed bed catalyst according to the invention having a diameter of 80 mm and covering the entire inner diameter of the tube, and having a height of 140 mm, was substituted for the filter device so that the channels of the structure were ordered along the direction of the circulatory flow in the reactor.

In this test, the basic structures consisted of a thin-walled ceramic material having a geometry resembling the glass fibre structure described in Example 1, test B. The walls of the ceramic structure were coated with a thin layer having a thickness of between 60 and 80 μm of the catalytically active material which consisted of porous active alumina containing Pd. During the test, the temperature was maintained at 56° C. and the pressure at an excess pressure of about 200 kPa. The circulatory flow in the reactor was determined at about 300 liters/hour during the entire test. The flow of working solution to the reactor was, as in test A, maintained constant at 20 liters/hour during the test period which lasted for 432 hours. The composition of the working solution at the beginning of the test resembled the composition at the beginning of test A. After 432 hours, the activity of the catalyst bed had decreased to 98% of the initial value which was 64.3 g of $H_2O_2$ per g of Pd per hour at a reaction of anthraquinone to anthrahydroquinone of about 45%.

The loss of so-called active quinone was determined at 0.8 mol per 1000 mols of hydrogen peroxide produced.

Test C

After test B had been finished, the tubular segment containing the fixed bed catalyst according to test B was replaced by an identical tubular segment containing a fixed bed catalyst according to the invention in which the basic structure consisted of thin-walled aluminum sheet metal having a geometry similar to that of test B. The walls of the aluminum structure were coated with a thin layer of porous silica gel whose large surface was coated with Pd.

Test C was conducted with freshly supplied working solution according to test A under otherwise identical conditions as in test B for a period of 760 hours. After that period, the activity of the catalyst bed had decreased to 90% of the initial value which was 61.2 g of $H_2O_2$ per g of Pd per hour at a reaction of anthraquinone to anthrahydroquinone of about 48%.

The loss of so-called active quinone was determined at 0.5 mol per 1000 mols of hydrogen peroxide produced.

EXAMPLE 4

Test A—Comparison Test

In a production plant for the production of hydrogen peroxide, comprising two series-connected agitator reactors each containing about 350 kg of suspension catalyst (so-called Raney nickel), continuous hydrogenation of working solution was carried out. The volume of each reactor was 8 m³, and the inflow of nonhydrogenated working solution, which was the same as the outflow of hydrogenated working solution, was maintained constant at 15 m³/hour for each reactor. The hydrogenation was conducted at about 56° C. and an excess pressure of 170 kPa. During the test, the working solution initially contained 0.39 mol of THEAK (tetrahydroethyl anthraquinone), 0.305 mol of EAK (ethyl anthraquinone) and 0.104 mol of THAK (tetrahydroanthraquinone) dissolved in each liter of working solution where the solvents consisted of a mixture of xylene and 2-octanol in a volume ratio of 1:1. The reaction of anthraquinones to anthrahydroquinones was maintained constant at 48% of the total quinone content and 77% of the tetrahydroanthraquinone proportion during the entire test period which comprised about 7500 hours. The loss of active anthraquinone during the test period was determined at 0.38 mol/1000 mols of hydrogen peroxide produced. To maintain the anthraquinone composition of the working solution constant and to compensate for loss of active anthraquinone, EAK and THAK were added in minor proportions during the test period. Although means for backwashing had been provided, it was necessary to replace all primary filters 10 times during the test period because these filters were clogged by the catalyst.

Test B

In a production plant for the production of hydrogen peroxide, the catalyst according to the invention was used in the hydrogenation stage. The catalyst had been placed in the reactor in the form of several series-connected circular segments having a diameter of 0.92 m according to the drawing. The entire flow of working solution and finely-divided hydrogen gas conducted through the catalyst bed was uniformly distributed over the entire cross-sectional area of the bed. The major part of the flow which had passed the catalyst bed from the bottom upwards, was recycled to the bed. A minor part of the circulation flow that had passed through the bed left the reactor chamber and was passed on to the oxidation stage. The outflow of hydrogenated working solution which was the same as the inflow of nonhydrogenated working solution, was maintained constant at about 12 $m^3$/hour. The temperature in the reactor loop was about 54° C., and the pressure about 250 kPa above atmospheric during the test period. The composition of the working solution supplied to the hydrogenation reactor was determined at the beginning of the test at 0.210 mol of EAK, 0.026 mol of THEAK, 0.480 mol of AAK (amyl anthraquinone) and 0.051 mol of THAAK (tetrahydroamyl anthraquinone) in every liter of working solution having a solvent composition of 55% by volume of "Shellsol AB", 30% by volume of nonanol, and 15% by volume of 2-octanol. During the test period which lasted for 2400 hours, the reaction on the total quinone content of the working solution was maintained at a total of about 32% of hydroquinone. The reaction of tetrahydroanthraquinones was then almost complete, and the reaction of anthraquinones EAK and AAK was about 24%, because the hydroquinone balance had firmly shifted to tetrahydroanthraquinone.

It is common knowledge that tetrahydroanthraquinones are more stable to degradation in the hydrogenation stage than anthraquinones. In view hereof, use is made in the majority of A/O processes of working solution compositions where the majority of the dissolved quinones are tetrahydroanthraquinones. In these "tetra" systems, normally only about 70–80% of the tetrahydroalkyl anthraquinones are reacted to tetrahydroalkyl anthrahydroquinone in order to avoid too rapid a degradation to by-products unable to form hydrogen peroxide in the subsequent process stages. In these "tetra" systems alkylanthrahydroquinone does not exist in measurable quantities because the balance has been shifted. In spite of the, to the hydrogenation stage, unfavourable reaction conditions during the test period, a loss of but 0.065 mol of active quinones per 1000 mols of hydrogen peroxide produced was established.

What we claim and desire to secure by Letters Patent is:

1. An improved method in the production of hydrogen peroxide by the alternate reduction and oxidation of alkylated anthraquinones which are dissolved in one or more organic solvents to form a liquid working solution, said working solution being subjected to catalytic hydrogenation in a reactor by contact with hydrogen in the presence of a hydrogenation catalyst, the improvement comprising causing an inflow of the working solution and hydrogen to flow through a fixed catalyst body having thin walls defining a multiplicity of parallel through channels of about equal length to divide said inflow into a multiplicity of partial flows of working solution and hydrogen, the central portions of said through channels generally permitting unimpeded flow, the hydrogenation catalyst being attached to said walls, whereby the contact time of the working solution and the hydrogen with the catalyst body for said partial flows is approximately equal.

2. A method as claimed in claim 1 wherein alternately planar and corrugated layers form said walls of said catalyst body and define said parallel channels.

3. A method as claimed in claim 1 wherein the hydrogenation catalyst is attached to said walls by means of a porous carrier.

4. A method as claimed in claim 1 wherein said walls comprise a porous carrier with reinforcement, said porous carrier having pores with the hydrogenation catalyst being disposed in said pores.

5. A method as claimed in claim 4 wherein said porous carrier has a thickness between about 60 $\mu$m and about 80 $\mu$m.

6. A method as claimed in claims 3, 4 or 5 wherein said porous carrier is selected from the group consisting of alumina, silicates and active carbon.

7. A method as claimed in claim 1 wherein the hydrogenation catalyst is a finely-divided noble metal selected from the group consisting of Pd, Pt, Rh and mixtures thereof.

8. A method as claimed in claim 1 wherein said inflow is divided by said catalyst body into a multiplicity of approximately equal partial flows.

9. A method as claimed in claim 1 wherein said through channels have a maximum cross-sectional dimension of less than about 10 mm.

10. A method as claimed in claim 1 wherein a plurality of catalyst bodies with said through channels in series collectively provide approximately equal contact times for all partial flows.

* * * * *